UNITED STATES PATENT OFFICE.

ALBERT THIELE, OF TICKFAW, ASSIGNOR OF ONE-HALF HIS RIGHT TO LOUIS SCHORMANN, OF NEW ORLEANS, LOUISIANA.

IMPROVEMENT IN COMPOSITION MASTIC.

Specification forming part of Letters Patent No. 142,595, dated September 9, 1873; application filed July 3, 1873.

*To all whom it may concern:*

Be it known that I, ALBERT THIELE, of Tickfaw, in the parish of Tangipahoa, State of Louisiana, have invented a new, useful, and Improved Composition Mastic; and I hereby declare the following to be a full, clear, and correct description of the same.

This invention relates to a cheap but suitable material to be employed for plastering the exterior of buildings, walls, and, in fact, for all purposes for which cement mastic is usually employed; and it is made by combining with about forty parts of clean sharp sand or gravel one hundred parts of common chalk, fifteen parts of tallow, and six parts of tar, all combined and thoroughly mixed together, and when so mixed it is to be applied to the surface of the wall or building precisely as common cement plaster is applied.

The above composition will make a cheap and durable mastic, as I have amply demonstrated by repeated experiments.

Having described my invention, what I claim as new, and desire to secure by Letters Patent, is—

The composition herein described, when composed of the ingredients combined in about the proportions stated, for the purposes set forth.

A. THIELE.

Witnesses:
 H. N. JENKINS,
 F. MILLER.